US009414469B2

(12) United States Patent
Chen et al.

(10) Patent No.: US 9,414,469 B2
(45) Date of Patent: Aug. 9, 2016

(54) INTEGRATED LAMP WITH AUTOMATIC EMERGENCY LIGHT AND REGULAR LIGHT

(71) Applicant: National Formosa University, Yunlin County (TW)

(72) Inventors: Yu-Kai Chen, Yunlin County (TW); Chin-Hsiung Chang, Yunlin County (TW)

(73) Assignee: NATIONAL FORMOSA UNIVERSITY, Yunlin County (TW)

( * ) Notice: Subject to any disclaimer, the term of this patent is extended or adjusted under 35 U.S.C. 154(b) by 273 days.

(21) Appl. No.: 14/108,004

(22) Filed: Dec. 16, 2013

(65) Prior Publication Data

US 2014/0354048 A1 Dec. 4, 2014

(30) Foreign Application Priority Data

May 29, 2013 (TW) ............................ 102118887 A

(51) Int. Cl.
*H02J 3/38* (2006.01)
*H02J 9/00* (2006.01)
*H05B 37/03* (2006.01)
*H05B 33/08* (2006.01)

(52) U.S. Cl.
CPC ............ *H05B 37/03* (2013.01); *H05B 33/0815* (2013.01); *Y10T 307/344* (2015.04)

(58) Field of Classification Search
CPC . H05B 37/03; H05B 33/0815; Y10T 307/344
USPC ........................................................... 307/23
See application file for complete search history.

(56) References Cited

U.S. PATENT DOCUMENTS

| | | | | |
|---|---|---|---|---|
| 2006/0152888 A1* | 7/2006 | Kurek et al. ......... | H01H 23/025 361/600 |
| 2015/0155743 A1* | 6/2015 | Noguchi ........... | H05B 33/0806 307/23 |
| 2015/0214785 A1* | 7/2015 | Jagjitpati et al. ... | H05B 33/0815 307/66 |

* cited by examiner

*Primary Examiner* — Rexford Barnie
*Assistant Examiner* — Toan Vu
(74) *Attorney, Agent, or Firm* — Muncy, Geissler, Olds & Lowe, P.C.

(57) ABSTRACT

An integrated lamp with automatic emergency light and regular light is provided in the present invention. The integrated lamp with automatic emergency light and regular light is coupled to an AC power source, wherein the AC power source includes a first AC terminal and a second AC terminal. The integrated lamp is controlled by a lamp switch, where the lamp switch includes a first terminal and a second terminal, where an indication light circuit is coupled between the first terminal and the second terminal of the lamp switch. The integrated lamp includes an AC detector. The AC detector is coupled between the second terminal of the lamp switch and the second AC terminal. When the lamp switch is turned off, the AC detector determines whether the current state is a power failure state or a normal state according to the electrical current and/or voltage from the indication light circuit to the second AC terminal.

14 Claims, 10 Drawing Sheets

INTEGRATED LAMP WITH AUTOMATIC EMERGENCY LIGHT AND REGULAR LIGHT

This application claims priority of No. 102118887 filed in Taiwan R.O.C. on May 29, 2013 under 35 USC 119, the entire content of which is hereby incorporated by reference.

BACKGROUND OF THE INVENTION

1. Field of Invention

The present invention relates to the technology of integrating the automatic emergency light and regular light, and more particularly to an integrated lamp with automatic emergency light and regular light.

2. Related Art

The automatic emergency light has become important equipment at home or in public place. Unfortunately, there is no corresponding wiring at old-fashioned house or in an old building. Even in a latest architecture, if an automatic emergency light has to be set-up at a place without a corresponding wiring, one of the first issue designers face is how to solve the wiring. The new added wiring would even affect the interior appearance sometimes. Meanwhile, in most occasions, the automatic emergency light is separately set-up. FIG. 1 illustrates a wiring diagram depicting the necessary wiring for the integrated lamp with automatic emergency light and regular light in the conventional art. Referring to FIG. 1, the household wiring diagram includes a live wire L, a neutral wire N, a lamp switch SW and a lamp 101. According to the FIG. 1, it can be seen that, if a lamp 101 has the function of automatic emergency light and regular light, its wiring has to continuously connect the AC power source L and the lamp switch SW at wall. The wiring is too complex because an extra wire 102 from the AC power source to the lamp is required.

Thus, to use a current lamp and wiring to set-up a lamp with function of automatic emergency light without significantly modifying the existing home wiring is where people having ordinary skill in the art going to exert themselves. A plurality of solutions is provided in most inventions for the abovementioned problem, wherein most people submit the wireless remote control method. The method is mainly adopted a wireless RF transmitter plugged an ordinary outlet, wherein the wireless RF transmitter is used for detecting the power failure of the outlet. When the power failure occurs, the wireless RF transmitter transmits a signal to the lamp with the function of automatic emergency light. The abovementioned method can affectively reduce the wiring.

Nevertheless, the extra wireless RF transmitter needs to be purchased in this method, and also, the lamp should be installed a wireless RF receiver accordingly. The abovementioned design would cause the high cost of the lamp. In addition, most people would be not easy to accept such an indirect way of assembling.

SUMMARY OF THE INVENTION

It is therefore an objective of the present invention to provide an integrated lamp with automatic emergency light and regular light, such that the detection of the AC power failure can be performed by low cost implementation, and also the modification of wiring or interior decoration is unnecessary.

To achieve the above-identified or other objectives, the present invention provides an integrated lamp with automatic emergency light and regular light. The integrated lamp with automatic emergency light and regular light is coupled to an alternate current (AC) power source, wherein the AC power source comprises a first AC terminal and a second AC terminal. The integrated lamp with automatic emergency light and regular light is controlled by a lamp switch. The lamp switch includes a first terminal, a second terminal and an indication light circuit. The first terminal of the lamp switch is coupled to the first AC terminal. The indication light circuit is coupled between the first terminal of the lamp switch and the second terminal of the lamp switch. An indication light is lit for representing that the lamp switch is turned off when the lamp switch is turned off.

The integrated lamp with automatic emergency light and regular light includes an AC detector, a battery and a lamp circuit. The AC detector is coupled between the second terminal of the lamp switch and the second AC terminal. The AC detector detects a voltage/current status between the second terminal of the lamp switch and the second AC terminal through the indication light circuit to determine whether a present state is a power failure state or a normal state when the lamp switch is turned off. The battery is disposed in the integrated lamp with automatic emergency light and regular light, for providing an electrical power to the integrated lamp with automatic emergency light and regular light in power failure. The lamp circuit includes a first input terminal and a second input terminal, wherein the first input terminal of the lamp circuit is coupled to the second terminal of the lamp switch, and the second input terminal of the lamp circuit is coupled to the second AC terminal. When the lamp switch is turned on, the lamp circuit turns on a lamp of the lamp circuit by using a received AC power. When the lamp switch is turned off and the AC detector determines that the present state is the normal state, the lamp circuit turns the lamp of the lamp circuit off. When the lamp switch is turned off and the AC detector determines that the present state is the power failure state, the lamp circuit turns on the lamp of the lamp circuit by using the electrical power of the battery.

The integrated lamp with automatic emergency light and regular light according to the preferred embodiment of the present invention, the indication light circuit includes a first current limiting resistor and the indication light. The first current limiting resistor includes a first terminal and a second terminal, wherein the first terminal of the first current limiting resistor is coupled to the first terminal of the lamp switch. The indication light includes a first terminal and a second terminal, wherein the first terminal of the indication light is coupled to the second terminal of the first current limiting resistor, and the second terminal of the indication light is coupled to the second terminal of the lamp switch. Also, in a preferred embodiment, the AC detector includes a bridge rectifier, a second current limiting resistor, a detection capacitor, a threshold voltage switch and a control circuit. The bridge rectifier includes a first input terminal, a second input terminal, a first rectifier terminal and a second rectifier terminal, wherein the first input terminal is coupled to the second terminal of the lamp switch, the second input terminal of the bridge rectifier is coupled to the second AC terminal, the second rectifier terminal is coupled to a first common voltage. The first terminal of the second current limiting resistor is coupled to the first rectifier terminal of the bridge rectifier. The first terminal of the detection capacitor is coupled to the second terminal of the second current limiting resistor, and the second terminal of the detection capacitor is coupled to the first common voltage. The first terminal of the threshold voltage switch is coupled to the second terminal of the second current limiting resistor, and the threshold voltage switch is conducted when a voltage between the first terminal of the threshold voltage switch and the second terminal of the threshold voltage switch is greater than a threshold voltage. The control circuit determines whether the present state is the normal state or the power failure state according to a current/voltage status of the threshold voltage switch.

The integrated lamp with automatic emergency light and regular light according to the preferred embodiment of the present invention, the control circuit includes a photo coupler, a pull high resistor and a microcontroller. The photo coupler includes a first input terminal, a second input terminal, a first output terminal and a second output terminal, wherein the first input terminal of the photo coupler is coupled to the second terminal of the threshold voltage switch, the second input terminal of the photo coupler is coupled to the first common voltage, and the second output terminal of the photo coupler is coupled to a second common voltage. The first terminal of the pull high resistor is coupled to a logic high voltage, and the second terminal of the pull high resistor is coupled to the first output terminal of the photo coupler. The microcontroller includes a detection terminal, wherein the detection terminal of the microcontroller is coupled to the first output terminal of the photo coupler. The microcontroller determines that the present state is the power failure state when a voltage of the detection terminal of the microcontroller is the logic high voltage for a preset period.

The integrated lamp with automatic emergency light and regular light according to the preferred embodiment of the present invention, the lamp circuit includes a power factor corrector, a battery charging circuit, a lamp driving circuit and an LED lamp. The power factor corrector is coupled to the first rectifier terminal and the second rectifier terminal of the bridge rectifier, wherein the power factor corrector comprises a first output terminal and a second output terminal which respectively provides a first DC voltage and a second DC voltage, wherein the power factor corrector is used for performing power factor correction. The battery charging circuit includes an input terminal and an output terminal, wherein the input terminal of the battery charging circuit is coupled to the first output terminal of the power factor corrector, the output terminal of the battery charging circuit is coupled to the battery, wherein the battery charging circuit converts the first DC voltage to a battery charging voltage for charging the battery. The lamp driving circuit includes an input terminal and an output terminal, wherein the input terminal of the lamp driving circuit is coupled to the second output terminal of the power factor corrector, wherein the lamp driving circuit converts the second DC voltage to a lamp driving voltage. The LED lamp is coupled to the output terminal of the lamp driving circuit for receiving the lamp driving voltage.

The integrated lamp with automatic emergency light and regular light according to the preferred embodiment of the present invention, the power factor corrector includes a transformer, an electrical switch, a pulse width modulation (PWM) circuit, a first rectifier diode, a first rectifier capacitor, a second rectifier diode and a second rectifier capacitor. The transformer includes a primary winding, a first secondary winding and a second secondary winding, wherein the primary winding comprises a first terminal and a second terminal, and the first secondary winding and the second secondary winding respectively comprise a first terminal and a second terminal, wherein the first terminal of the primary winding is coupled to the first rectifier terminal of the bridge rectifier, and the second terminals of the first and the second secondary windings are coupled to the second common voltage. The electrical switch includes a first terminal, a second terminal and a control terminal, wherein the first terminal of the electrical switch is coupled to the second terminal of the primary winding of the transformer, and the second terminal of the electrical switch is coupled to the first common voltage. The PWM circuit is coupled to the control terminal of the electrical switch, for controlling the conduction of the electrical switch by PWM to further control voltages of the first and the second secondary windings. The anode of the first rectifier diode is coupled to the first terminal of the first secondary winding, and the cathode of the first rectifier diode is coupled to the input terminal of the battery charging circuit. The first terminal of the first rectifier capacitor is coupled to the cathode of the first rectifier diode, and the second terminal of the first rectifier capacitor is coupled to the second common voltage. The anode of the second rectifier diode is coupled to the first terminal of the second secondary winding, and the cathode of the second rectifier diode is coupled to the input terminal of the lamp driving circuit. The first terminal of the second rectifier capacitor is coupled to the cathode of the second rectifier diode, and the second terminal of the second rectifier capacitor is coupled to the second common voltage.

The present invention further provides an integrated lamp with automatic emergency light and regular light. The integrated lamp with automatic emergency light and regular light is coupled to an alternate current (AC) power source. The AC power source includes a first AC terminal and a second AC terminal. The integrated lamp with automatic emergency light and regular light is controlled by a lamp switch. The lamp switch includes a first terminal, a first socket, a second terminal and a second socket. The first terminal of the lamp switch is coupled to the first AC terminal through the first socket. The integrated lamp with automatic emergency light and regular light includes a plug-in resistance element, an AC detector, a battery and a lamp circuit. The plug-in resistance element includes a first plug, a second plug, a first socket and a second socket. The first plug of the plug-in resistance element is coupled to the first terminal of the lamp switch through the first socket of the lamp switch, and the second plug of the plug-in resistance element is coupled to the second terminal of the lamp switch through the second socket of the lamp switch, and the first socket of the plug-in resistance element is coupled to the first AC terminal. The AC detector is coupled between the second socket of the plug-in resistance element and the second AC terminal, wherein the AC detector detects a voltage/current status between the second terminal of the lamp switch and the second AC terminal through the plug-in resistance element to determine whether a present state is a power failure state or a normal state when the lamp switch is turned off. The battery is disposed in the integrated lamp with automatic emergency light and regular light, for providing an electrical power to the integrated lamp with automatic emergency light and regular light in power failure. The lamp circuit includes a first input terminal and a second input terminal, wherein the first input terminal of the lamp circuit is coupled to the second socket of the plug-in resistance element, and the second input terminal of the lamp circuit is coupled to the second AC terminal. When the lamp switch is turned on, the lamp circuit turns a lamp of the lamp circuit on by using a received AC power. When the lamp switch is turned off and the AC detector determines that the present state is the normal state, the lamp circuit turns the lamp of the lamp circuit off. When the lamp switch is turned off and the AC detector determines that the present state is the power failure state, the lamp circuit turns on the lamp of the lamp circuit by using the electrical power of the battery.

The spirit of the present invention is to detect the current and/or voltage state of the shunt impedance of the switch to determine whether the power failure occurs or not. The implementation can uses a neon switch or a switch with a plug-in resistance element. When the power detection circuit in the preferred embodiment of the present invention is adopted, modification of wiring is unnecessary. In other words, the integrated lamp with automatic emergency light and regular light of the present invention can be assembled without remodeling the original interior decoration.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Without the modification of wiring or interior decoration, an integrated lamp with automatic emergency light and regular light is provided in the present invention. User only needs to assemble the integrated lamp to connect to the output terminal of the lamp switch, the integrated lamp will produce the function of the automatic emergency light and regular light can be operated normally.

Figure 1:
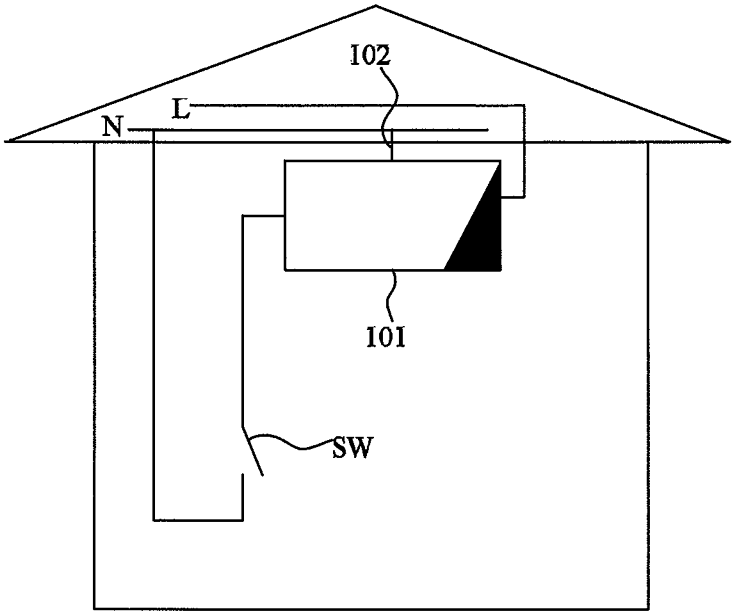
FIG. 1 (Prior Art)
FIG. 1 illustrates a wiring diagram depicting the necessary wiring for the integrated lamp with automatic emergency light and regular light in the conventional art.
Figure 2:
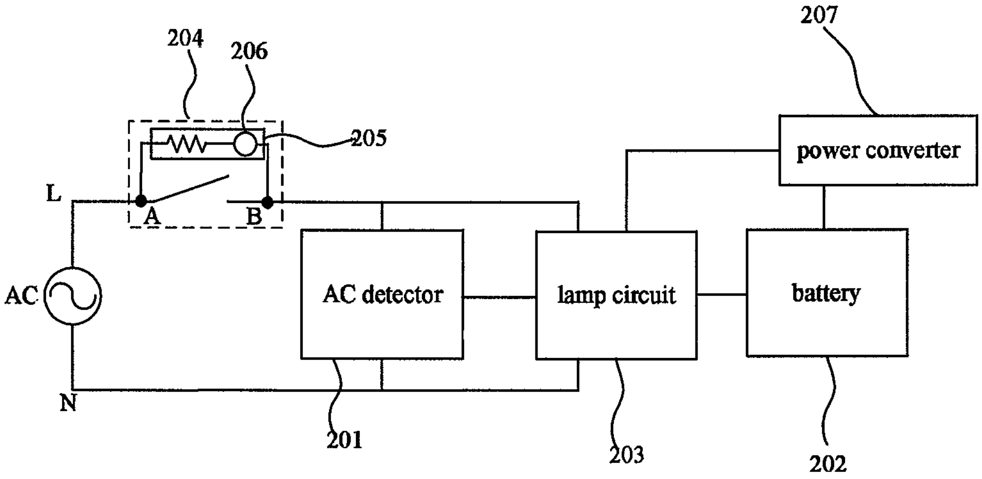
FIG. 2 illustrates a circuit block diagram depicting an integrated lamp with automatic emergency light and regular light according to a preferred embodiment of the present invention.

FIG. 2 illustrates a circuit block diagram depicting an integrated lamp with automatic emergency light and regular light according to a preferred embodiment of the present invention. Referring to FIG. 2, the integrated lamp with automatic emergency light and regular light includes an AC detector 201, a battery 202 and a lamp circuit 203 and a power converting circuit 207. In order to make people having ordinary skill in the art further understand the spirit of the present invention, an extra lamp switch 204 is illustrated in FIG. 2, wherein the lamp switch 204 includes a indication light circuit 205, which the lamp switch is so-called a neon switch. The design of the neon switch 204 is mainly used for conveniently searching the lamp switch by people at night when the lamp is turned off. When the neon switch 204 is turned off, there is a weak current flowing from the live wire L to the indication light circuit 205. Thus, the indication light 206 is lit. When the neon switch 204 is turned on, the node A and the node B is short circuit. Thus, there is no current flowing through the indication light circuit 205, and the indication light 206 is extinguished.

The AC detector 201 is coupled between the second terminal B of the lamp switch 204 and the neutral wire N. When the lamp switch 204 is turned off, the AC detector 201 determine whether the present state is a normal state or a power failure state according to the voltage/current status between the second terminal B of the lamp switch 204 and the neutral wire N. In order to minimize the wiring, in the present embodiment, the neon switch 204 is adopted. When the AC power still exists and the neon switch 204 is turned off, there is small current flowing through the indication light circuit 205 of the neon switch 204. Thus, the AC detector 201 can detects whether the AC power failure occurs or not when the lamp switch 204 is turn on or the lamp switch 204 is turned off.

The battery 202 is disposed in the integrated lamp with automatic emergency light and regular light for providing power to the power converter 207 at power failure, and the power converter 207 performs the power conversion. Thus, the power of the lamp circuit 203 would not be interrupted when the AC power is unstable or when the AC power is failed. The first input terminal of the lamp circuit 203 is coupled to the second terminal B of the lamp switch 204, and the second input terminal of the lamp circuit 203 is coupled to the neutral wire N. When the lamp switch 204 is turned on, the lamp circuit 203 uses the received AC power to light the lamp of the lamp circuit 203. When the lamp switch 204 is turned on, the AC detector 201 can naturally detects whether the power failure occurs or not by the voltage/current status between the live wire L and neutral wire N.

When the lamp switch is turned off, the AC detector 201 can detects whether the power failure occurs or not through the voltage/current status of the indication light circuit 205. When the lamp switch 204 is turned off and the AC detector 201 determines that the present state is a normal state, the lamp circuit 203 extinguishes the lamp(s) of the lamp circuit 203. When the lamp switch 204 is turned off and the AC detector 201 determines that the present state is a power failure state, the lamp circuit 203 uses the power received from the battery 202 to light the lamp(s) of the lamp circuit 203 to perform emergency light.

Figure 3:
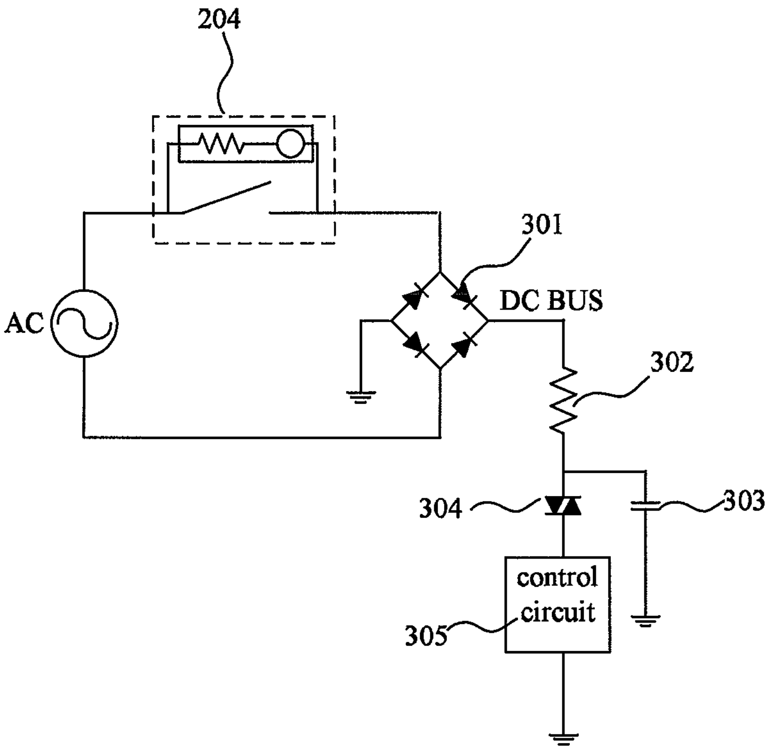
FIG. 3 illustrates a circuit diagram depicting the AC detector 201 of the integrated lamp with automatic emergency light and regular light according to a preferred embodiment of the present invention.

FIG. 3 illustrates a circuit diagram depicting the AC detector 201 of the integrated lamp with automatic emergency light and regular light according to a preferred embodiment of the present invention. Referring to FIG. 3, the AC detector 201 includes a bridge rectifier 301, a current limiting resistor 302, a detection capacitor 303, a diode AC switch (DIAC) 304 and a control circuit 305, wherein the AC detector 201 is coupled to the lamp switch 204. In the present embodiment, the circuit without electrical isolation is provided for example. Since the AC power is inputted to the AC detector 201 through the lamp switch 204 when the lamp switch 204 is turned on, the AC detector 201 can directly detects the AC power. Hence, in the following embodiment, the lamp switch 204 is turned off for example, such that the people having ordinary skill in the art can easily understand the spirit of the present invention.

Figure 4:
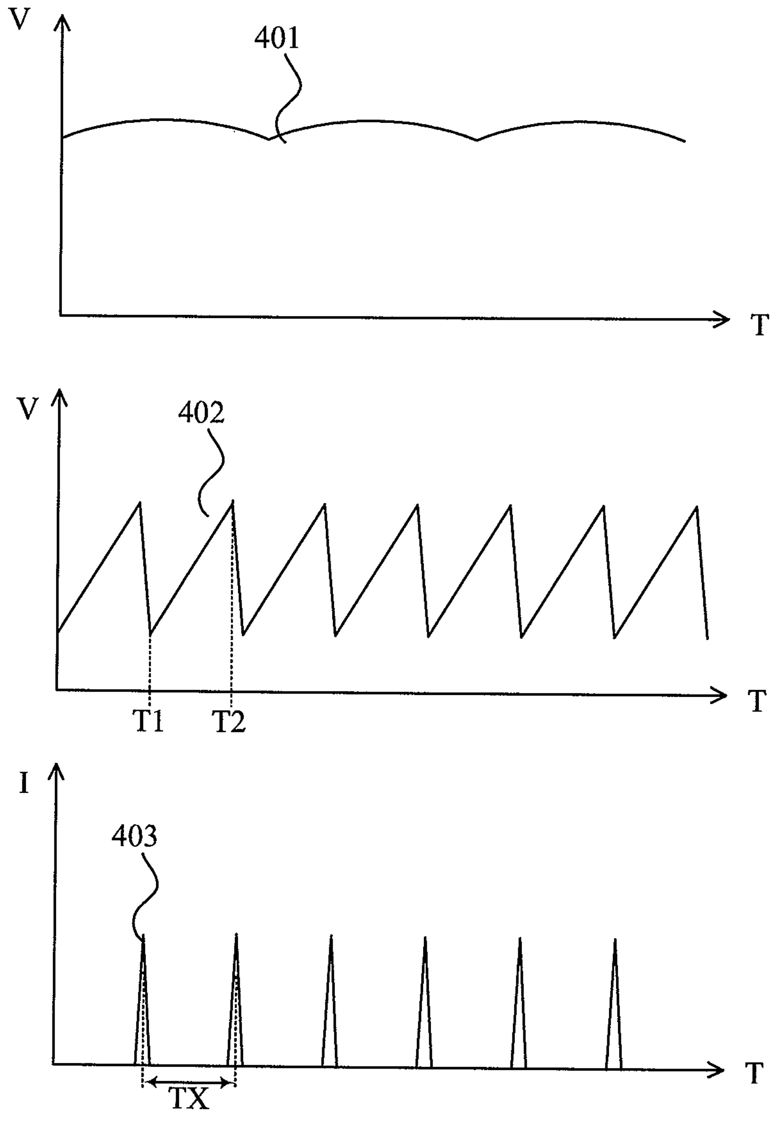
FIG. 4 illustrates a waveform diagram depicting the operation of the AC detector 201 of the integrated lamp with automatic emergency light and regular light according to a preferred embodiment of the present invention.

FIG. 4 illustrates a waveform diagram depicting the operation of the AC detector 201 of the integrated lamp with automatic emergency light and regular light according to a preferred embodiment of the present invention. Referring to FIG. 3 and FIG. 4, the waveform 401 represents the voltage waveform of the DC bus, and the waveform 402 represents the voltage waveform VC of the detection capacitor 303. When the lamp switch 204 is turned off, the AC voltage VAC is inputted from the indication light circuit 205 to the bridge rectifier 301. At the time point T1, the small current flowing through the bridge rectifier 301 charges the detection capacitor 303 through the current limiting resistor 302. When the voltage VC of the detection capacitor 303 is charged to 40V (at the time point T2), the DIAC 304 is triggered to conduct, the detection capacitor 303 would rapidly discharged. Afterward, the DIAC 304 is cut-off. Next, the AC detector 201 is repeatedly operated as the abovementioned description. The control circuit 305 can detect the voltage of the detection capacitor 303 or the current/voltage of the DIAC 304.

In the present embodiment, the control circuit 305 detects the current of the DIAC 304. In the present embodiment, when the AC power exists, the current waveform of the DIAC 304 is shown at label 403 in FIG. 4. During each preset period TX, a current pulse is produced. The control circuit 305 determines that the current state is the power failure state if the current pulse is not received for a period, such as five times of the preset period TX. Afterward, the control circuit 305 would notify the integrated lamp with automatic emergency light and regular light to enter a power failure mode such that the power of the battery 202 is used to light the emergency lamp or all of lamps. When the AC power is unstable, the AC power may instantly interrupt and then recover. If the situation happens, the conventional AC detector usually would instantly light the emergency lamp and then instantly extinguish the emergency lamp. Nevertheless, the user may misunderstand that the situation is supernatural phenomenon. Also, user will have a negative perception to the emergency light. Since the control circuit 305 in the present embodiment of the present invention lights the lamp when the pulse is not received for a period, that is to say, the circuit of the present embodiment of the present invention would verify that the AC power is completely failed, and then the emergency light is lit. Thus, the abovementioned flicker of the emergency light can be prevented.

People having ordinary skill in the art should know that the DIAC 304 is only an exemplary embodiment, and it may be replaced by a Zener diode. In other words, as long as the voltage between two terminals of a threshold voltage element/switch reaches a threshold voltage and then the circuit between two terminals of the threshold voltage element/switch is conducted, the threshold voltage element/switch can be used for replacing the DIAC 304. Thus, the present invention is not limited thereto.

Figure 5A:
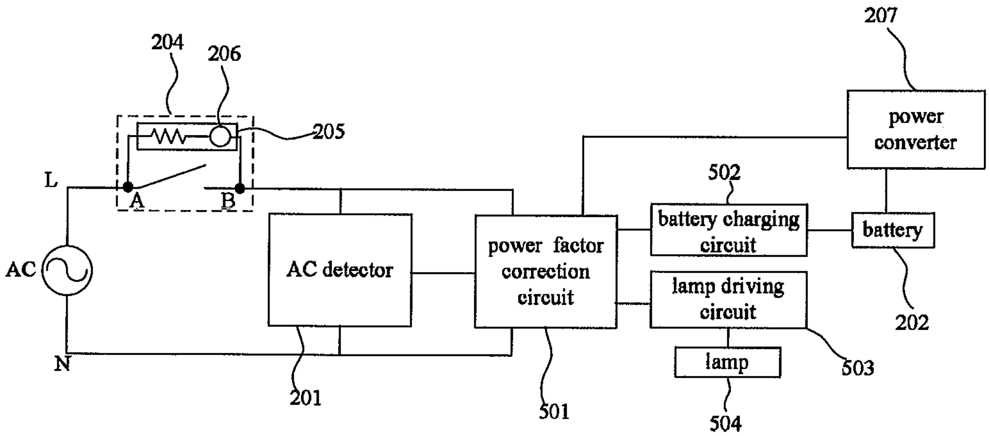
FIG. 5A illustrates a detail circuit diagram depicting the integrated lamp with automatic emergency light and regular light according to a preferred embodiment of the present invention.

FIG. 5A illustrates a detail circuit diagram depicting the integrated lamp with automatic emergency light and regular light according to a preferred embodiment of the present invention. Referring to FIG. 5A, the circuit divides the lamp circuit 203 into a power factor corrector 501, a battery charging circuit 502, a lamp driving circuit 503 and a lamp 504. The power factor corrector 501 is used for performing power factor correction to the received AC power and supplying the power to the battery charging circuit 502 and the lamp driving circuit 503. The battery charging circuit 502 is used for charging the battery. The lamp driving circuit 503 is used for driving the lamp 504.

Figure 5B:
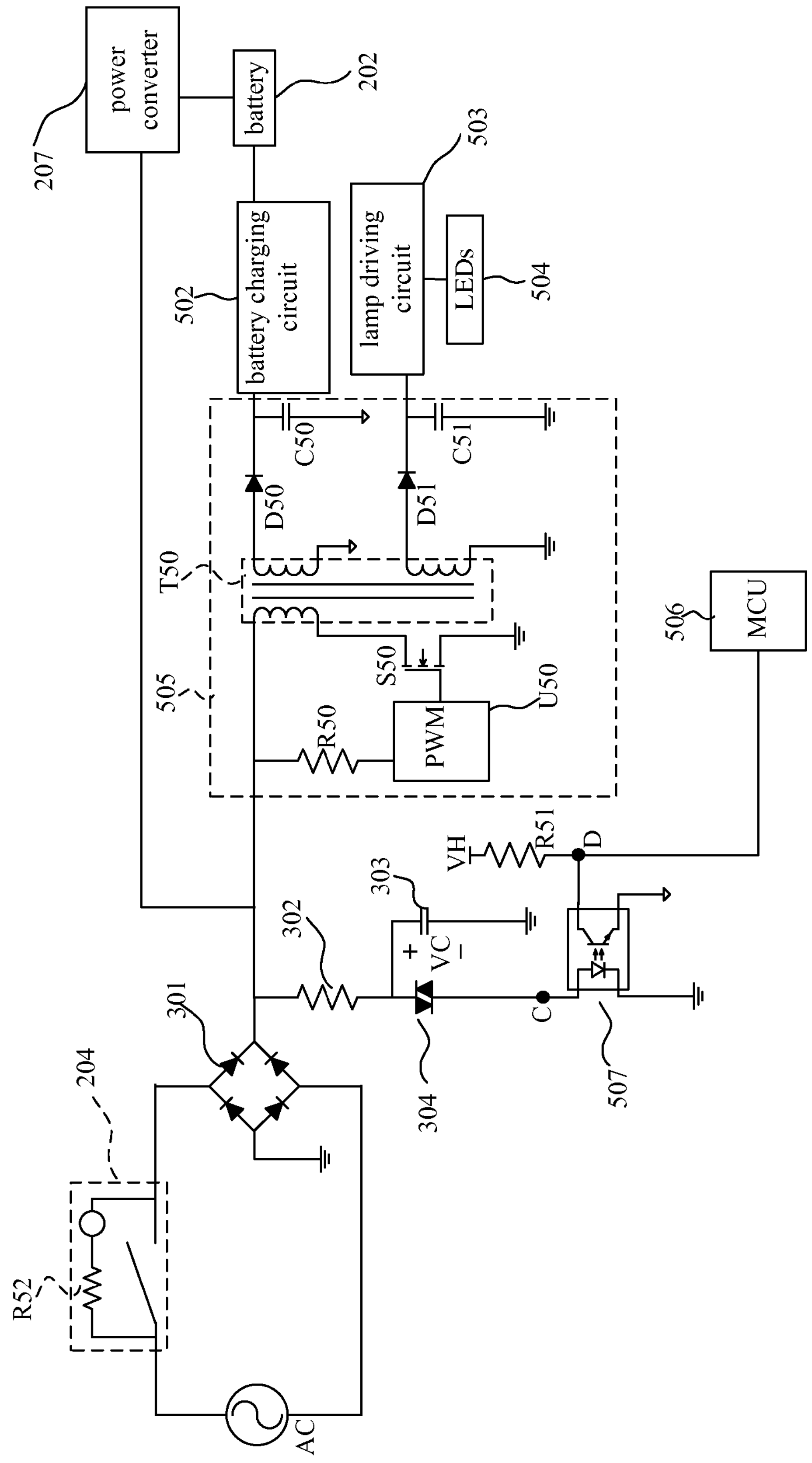
FIG. 5B illustrates a detail circuit diagram depicting the integrated lamp with automatic emergency light and regular light according to a preferred embodiment of the present invention.

FIG. 5B illustrates a detail circuit diagram depicting the integrated lamp with automatic emergency light and regular light according to a preferred embodiment of the present invention. Referring to FIG. 5B, the circuit includes the bridge rectifier 301, the current limiting resistor 302, the detection capacitor 303, the DIAC 304, a flyback DC to DC converter 505, a microcontroller 506, a pull-high resistor R51, a photo coupler 507, the battery charging circuit 502, the lamp driving circuit 503, a series of LEDs 504, the power converter 207 and the battery 202. The flyback DC to DC converter 505 includes a start-up resistor R50, a PWM (pulse width modulation) circuit U50, an electrical switch S50, rectifier diodes D50, D51, rectifier capacitors C50, C51 and a transformer T50. In the present embodiment, the main circuit of the AC detector 201 is the microcontroller 506. Since the microcontroller 506 belongs to a weak current circuit and the AC power belongs to heavy current, the electrical isolation is necessary to separate the weak current part and the heavy current part and to ensure the safety.

In the present embodiment, the flyback DC to DC converter 505 is not only used for electrical isolation, but mainly used for power factor correction (PFC), which is to adjust the phase of the AC voltage and the phase of the AC current as consistent as possible to let power factor approach 1. In addition, the flyback DC to DC converter 505 also would generate two voltages, respectively supplying to the battery charging circuit 502 and the lamp driving circuit 503. The battery charging circuit 502 is a DC to DC converter for generating a DC voltage/current to charge the battery 202. Further, because the LEDs are taken as an example for the lamp 504, the lamp driving circuit 503 is also a DC to DC converter to supply a DC voltage/current which the LEDs 504 requires.

Since the AC detector can naturally determine whether the AC power exists or not from the current or voltage between the live wire L and the neutral wire N when the lamp switch 204 is turned on, the following embodiment describes the situation when the lamp switch 204 is turned off. Assuming the lamp switch 204 is turned off, the battery 202 and the power converting circuit 207 would replace the AC power to supply the power to the flyback DC to DC converter 505 to maintain the AC detector's operation. Because the LEDs 504 are extinguished when the lamp switch 204 is turned off, the AC detecting mechanism can be maintained by minority power supplied from the battery 202.

The indication light circuit of the lamp switch 204 would provide small current such that the start-up resistor R50 would flow through a small current to enable the PWM circuit U50. After the PWM circuit U50 is enabled, the electrical switch S50 starts to work. Thus, the auxiliary winding of the transformer T50 supplies the voltage VCC to the PWM circuit U50. Meanwhile, the secondary winding also supplies the voltage to the microcontroller 506. The DIAC 304 is adopted in the present embodiment. Because the trigger voltage of the DIAC 304 is about 32V, the design of the start-up resistor R50 should conform that the dividing voltage by the resistor in the indication light circuit of the lamp switch 204 and the start-up resistor R50 is greater than 32V.

When the AC power exists, the AC current/voltage charges the detection capacitor 303 through the bridge rectifier 301 and the current limiting resistor 302. When the voltage VC of the detection capacitor 303 is charged to 32V, the DIAC would be triggered and conducted. Meanwhile, the charges stored in the detection capacitor 303 are discharged from the node C through the photo coupler 507. The voltage of the node D on the other side of the photo coupler 507 would be pulled low to the logic low voltage due to the conduction of the photo coupler 507.

Figure 6:
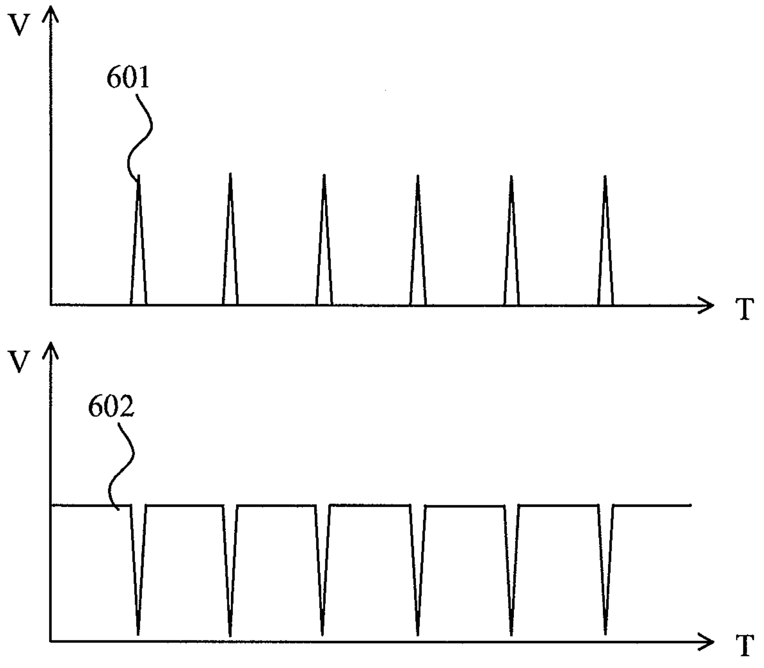
FIG. 6 illustrates the waveform diagram depicting the operation of the AC detector 201 of the integrated lamp with automatic emergency light and regular light according to a preferred embodiment of the present invention.

FIG. 6 illustrates the waveform diagram depicting the operation of the AC detector 201 of the integrated lamp with automatic emergency light and regular light according to a preferred embodiment of the present invention. Referring to FIG. 5B and FIG. 6, the waveform 601 represent the voltage of node C, and the waveform 602 represent the voltage of node D. The detection terminal of the microcontroller 506 is coupled to the node D for determining whether the node D consecutively outputs the pulse. If the power failure occurs, there is no current flowing through the DIAC 304. Therefore, the voltage of the node D would be kept at logic high voltage VH. After a period, the microcontroller 506 still detects that the voltage of the node D is logic high voltage HV, the microcontroller 506 determines that the present state is the power failure state.

The power of the abovementioned AC detector 201 in FIG. 5B adopts battery when the power failure occurs. Hence, even when the AC power is suddenly interrupted, the mechanism of the AC detection would not be instantly stopped. Furthermore, the AC detector 201 can be normally operated when the AC power is unstable such that the power supplying to the lamp would not be suddenly interrupted and then suddenly restored.

Moreover, the flyback DC to DC converter is adopted in the embodiment of FIG. 5B. Nevertheless, people having ordinary skill in the art should know that the other power converter can also be implemented to replace the flyback DC to DC converter in FIG. 5B. Thus, the present invention is not limited thereto. In addition, the abovementioned embodiment adopts the photo coupler 503 for detecting current. Nevertheless, people having ordinary skill in the art should know that the photo coupler 503 can be also replaced by the other form of relay circuit in order to achieve the isolation and current detection. Thus, the present invention is not limited thereto.

The abovementioned embodiment adopts the neon switch to serve as an exemplary example. Nevertheless, users may not want to replace the normal lamp switch to the neon switch because of the appearance, the uniformity of interior design or the other reasons. In the following embodiment, Applicants provides another preferred embodiment to detect the AC power without change the normal lamp switch when the normal lamp switch is turned off.

Figure 7:
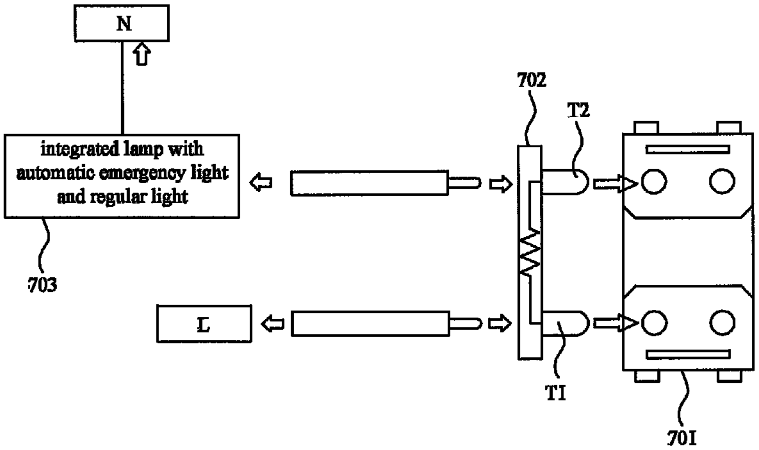
FIG. 7 illustrates a schematic depicting a plug-in element for the lamp switch according to a preferred embodiment of the present invention.

FIG. 7 illustrates a schematic depicting a plug-in element for the lamp switch according to a preferred embodiment of the present invention. Referring to FIG. 7, the label 701 represents the rear view of the lamp switch in the conventional art; the label 702 represents the plug-in resistance element of the embodiment of the present invention; and the label 703 represents the integrated lamp with automatic emergency light and regular light of the embodiment of the present invention. As shown in FIG. 7, the first socket (socket for lamp) of the lamp switch 701 is connected to the second plug T2 of the plug-in resistance element 702, the second socket (socket for live wire) of the lamp switch 701 is connected to the first plug T1 of the plug-in resistance element 702, the second socket of the plug-in resistance element 702 is coupled to the integrated lamp 703 with automatic emergency light and regular light of the embodiment of the present invention through the electric wire, and the first socket of the plug-in resistance element 702 is coupled to the live wire L through the electric wire. According to FIG. 7, it can be seen that the lamp switch without the indication light circuit can be adopted in the present embodiment. In the implementation, if the conventional lamp switch is plugged a plug-in resistance element 702, the integrated lamp 703 with automatic emergency light and regular light of the embodiment of the present invention can be directly installed.

Figure 8A:
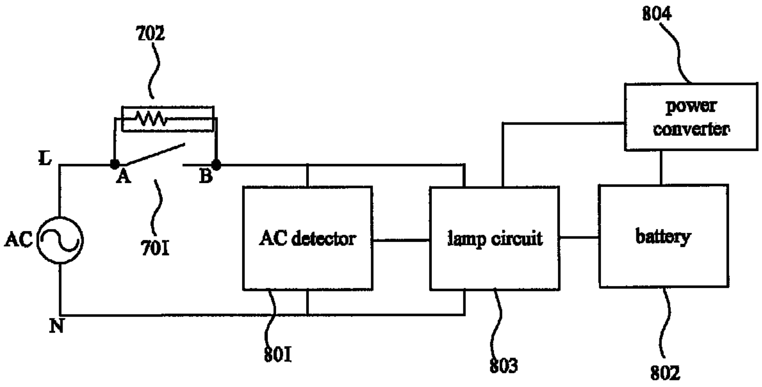
FIG. 8A illustrates a circuit block diagram depicting the integrated lamp with automatic emergency light and regular light according to a preferred embodiment of the present invention.

FIG. 8A illustrates a circuit block diagram depicting the integrated lamp with automatic emergency light and regular light according to a preferred embodiment of the present invention. Referring to FIG. 7, FIG. 8A and FIG. 2, the circuit includes a lamp switch 701, a shunted plug-in resistance element 702, an AC detector 801, a battery 802, a lamp circuit 803 and a power converting circuit 804. The difference between the circuit in FIG. 8 and the circuit in FIG. 2 is that the lamp switch in FIG. 2 includes a shunted indication light and a current limiting resistor and the lamp switch 701 in FIG. 8 shunts a plug-in resistance element 702 in the present embodiment. Since the AC detection mechanism in FIG. 8 is the same as the AC detection mechanism in FIG. 2, the detail description is omitted. According to FIG. 7 and FIG. 8, it can be seen that the general lamp switch without the indication light can be used in this embodiment. In the implementation thereof, if the conventional lamp switch is plugged a plug-in resistance element, the integrated lamp with automatic emergency light and regular light of the embodiment of the present invention can be directly installed.

Figure 8B:
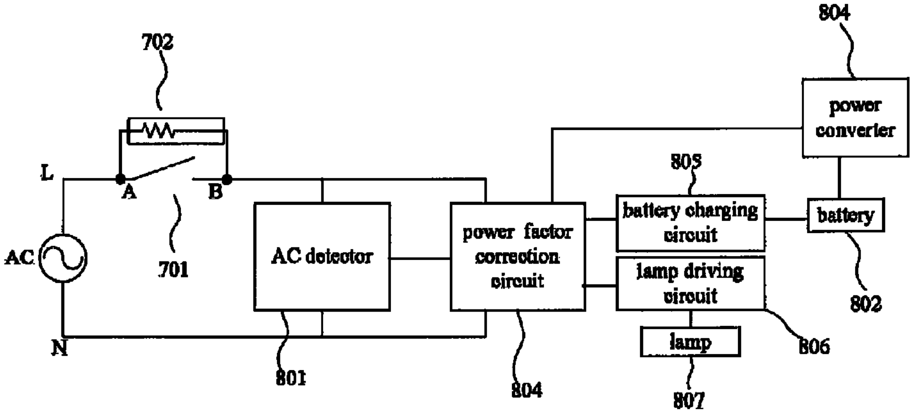
FIG. 8B illustrates a circuit block diagram depicting the integrated lamp with automatic emergency light and regular light according to a preferred embodiment of the present invention.

FIG. 8B illustrates a circuit block diagram depicting the integrated lamp with automatic emergency light and regular light according to a preferred embodiment of the present invention. Referring to FIG. 5A, FIG. 8A and FIG. 8B, similarly, the circuit diagram divides the lamp circuit 803 into the power factor correction circuit 804, the battery charging circuit 805, the lamp driving circuit 806 and the lamp 807. The power factor correction circuit 804 is used for performing the power factor correction to the received AC power and for supplying the electrical power to the battery charging circuit 805 and the lamp driving circuit 806. The battery charging circuit 805 is used for charging the battery 802. The lamp driving circuit 806 is used for driving the lamp 807.

Figure 9:
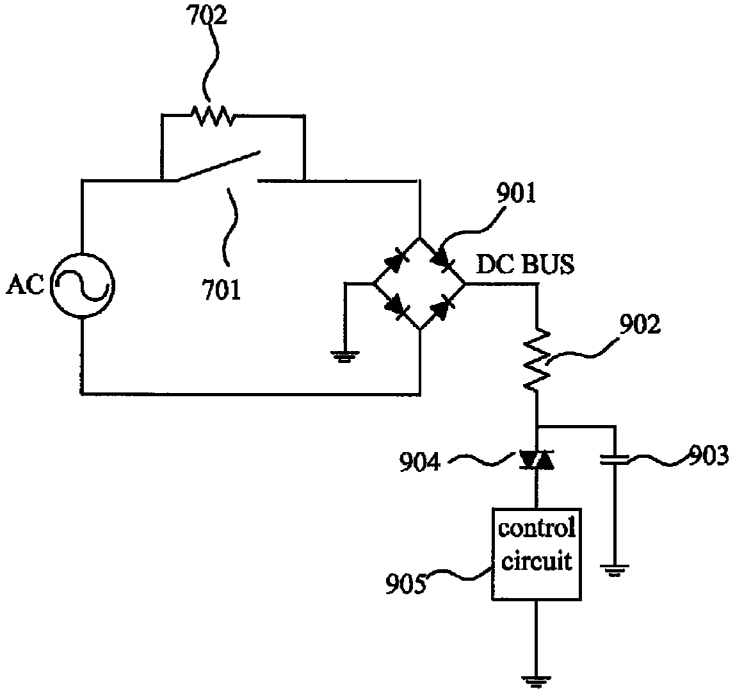
FIG. 9 illustrates a circuit diagram depicting the AC detector 801 of the integrated lamp with automatic emergency light and regular light according to a preferred embodiment of the present invention.

FIG. 9 illustrates a circuit diagram depicting the AC detector 801 of the integrated lamp with automatic emergency light and regular light according to a preferred embodiment of the present invention. Referring to FIG. 9, the AC detector 801 includes a bridge rectifier 901, a current limiting resistor 902, a detection capacitor 903, a DIAC (diode AC switch) 904 and a control circuit 905. Comparing the circuit in FIG. 9 with the circuit in FIG. 3, the difference thereof is just the lamp switch. Since the AC detection mechanism in FIG. 9 is the same as the AC detection mechanism in FIG. 3, the detail description is omitted.

Figure 10:
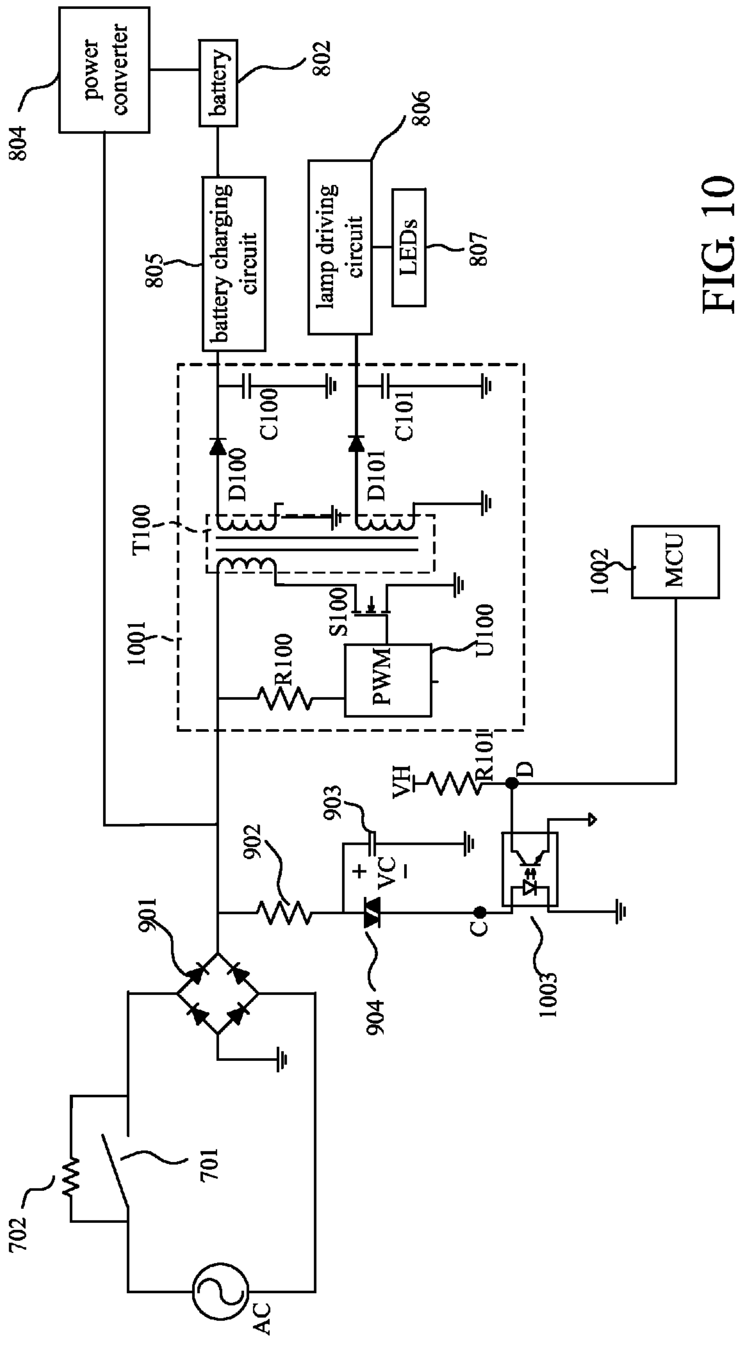
FIG. 10 illustrates a detail circuit diagram depicting the integrated lamp with automatic emergency light and regular light according to a preferred embodiment of the present invention.

FIG. 10 illustrates a detail circuit diagram depicting the integrated lamp with automatic emergency light and regular light according to a preferred embodiment of the present invention. Referring to FIG. 10, the circuit includes the abovementioned plug-in resistance element 701, the lamp switch 702, a bridge rectifier 901, a current limiting resistor 902, a detection capacitor 903, a DIAC (diode AC switch) 904, a flyback DC to DC converter 1001, a microcontroller 1002, a pull high resistor R101, a photo coupler 1003, the battery 802, the battery charging circuit 805, the lamp driving circuit 806, the power converter 804 and the LEDs 807. The flyback DC to DC converter 1001 is also used for performing power factor correction, wherein the flyback DC to DC converter 1001 includes a start-up resistor R100, a PWM circuit U100, an electrical switch S100, a rectifier diodes D100, D101, a rectifier capacitors C100, C101 and a transformer T100. In the present embodiment, the microcontroller 1002 is the main circuit of the AC detector 801. Since the microcontroller 1002 belongs to a weak current circuit and the AC power belongs to heavy current, the electrical isolation is necessary to separate the weak current part and the heavy current part and to ensure the safety. Comparing the circuit in FIG. 10 with the circuit in FIG. 5B, the difference thereof is the lamp switch. Since the AC detection mechanism in FIG. 10 is the same as the AC detection mechanism in FIG. 5B, the detail description is omitted.

Figure 11:
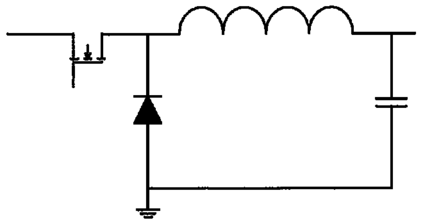
FIG. 11 illustrates a circuit diagram depicting the battery charging circuit 805 or the lamp driving circuit 806 of the integrated lamp with automatic emergency light and regular light according to a preferred embodiment of the present invention.
Figure 12:
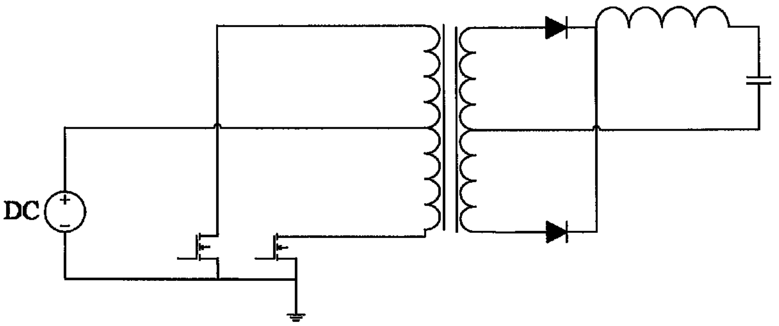
FIG. 12 illustrates a circuit diagram depicting the power converting circuit 804 of the integrated lamp with automatic emergency light and regular light according to a preferred embodiment of the present invention.

FIG. 11 illustrates a circuit diagram depicting the battery charging circuit 805 or the lamp driving circuit 806 of the integrated lamp with automatic emergency light and regular light according to a preferred embodiment of the present invention. Referring to FIG. 11, in the present embodiment, the battery charging circuit 805 and the lamp driving circuit 806 can be implemented by the buck converter. Similarly, the battery charging circuit 502 and the lamp driving circuit 503 in FIG. 5B also can be implemented by the buck converter. FIG. 12 illustrates a circuit diagram depicting the power converting circuit 804 of the integrated lamp with automatic emergency light and regular light according to a preferred embodiment of the present invention. Referring to FIG. 12, in the present embodiment, the power converter 804 for the battery to supply the power back to the flyback DC to DC converter 1001 is implemented by the push-pull converter. The power supplying to the microcontroller 506 or 1002 can be selectively used the DC power outputting from the battery charging circuit 805 or the lamp driving circuit 806. Furthermore, although the abovementioned embodiment adopts the buck converter or the push-pull converter to serve as an exemplary example, people having ordinary skill in the art should know that the other DC to DC converter can be adopted according to the different designs, such as the buck-boost converter. Thus, the present invention is not limited thereto.

In summary, the spirit of the present invention is to detect the current and/or voltage state of the shunt impedance of the switch to determine whether the power failure occurs or not. The implementation can uses a neon switch or a plug-in resistance element. When the power detection circuit in the preferred embodiment of the present invention is adopted, re-wiring is unnecessary. In other words, the integrated lamp with automatic emergency light and regular light of the present invention can be assembled without remodeling the original interior decoration.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. An integrated lamp with automatic emergency light and regular light, coupled to an alternate current (AC) power source, wherein the AC power source comprises a first AC terminal and a second AC terminal, wherein the integrated lamp with automatic emergency light and regular light is controlled by a lamp switch, wherein the lamp switch comprises a first terminal, a second terminal and an indication light circuit, wherein the first terminal of the lamp switch is coupled to the first AC terminal, wherein the indication light circuit is coupled between the first terminal of the lamp switch and the second terminal of the lamp switch, wherein an indication light of the indication light circuit is lit for representing that the lamp switch is turned off when the lamp switch is turned off by an user;

wherein the integrated lamp with automatic emergency light and regular light comprises: an AC detector, coupled between the second terminal of the lamp switch and the second AC terminal, wherein the AC detector detects a voltage/current status between the second terminal of the lamp switch and the second AC terminal through the indication light circuit to determine whether a present state is a power failure state or a normal state when the lamp switch is turned off;

a battery, disposed in the integrated lamp with automatic emergency light and regular light, for providing an electrical power to the integrated lamp with automatic emergency light and regular light in power failure; and a lamp circuit, comprising a first input terminal and a second input terminal, wherein the first input terminal of the lamp circuit is coupled to the second terminal of the lamp switch, and the second input terminal of the lamp circuit is coupled to the second AC terminal;

wherein the lamp circuit turns a lamp of the lamp circuit on by using a received AC power when the lamp switch is turned on, wherein the lamp circuit turns the lamp of the lamp circuit off when the lamp switch is turned off and the AC detector determines that the present state is the normal state, wherein the lamp circuit turns the lamp of the lamp circuit on by using the electrical power of the battery when the lamp switch is turned off and the AC detector determines that the present state is the power failure state, wherein the AC detector determines that the present state is the normal state when the AC detector detects that an AC current/voltage goes to the indication light circuit and the lamp switch is turned off, and wherein the AC detector determines that tile present state is the power failure state when the AC detector does not detect that the AC current/voltage goes to the indication light circuit.

2. The integrated lamp with automatic emergency light and regular light according to claim 1, wherein the indication light circuit comprises:

a first current limiting resistor, comprising a first terminal and a second terminal, Wherein the first terminal of the first current limiting resistor is coupled to the first terminal of the lamp switch; and the indication light, comprising a first terminal and a second terminal, wherein the first terminal of the indication light is coupled to the second terminal of the first current limiting resistor, and the second terminal of the indication light is coupled to the second terminal of the lamp switch.

3. The integrated lamp with automatic emergency light and regular light according to claim 1, wherein the AC detector comprises:

a bridge rectifier, comprising a first input terminal, a second input terminal, a first rectifier terminal and a second rectifier terminal, wherein the first input terminal is coupled to the second terminal of the lamp switch, the second input terminal of the bridge rectifier is coupled to the second AC terminal, the second rectifier terminal is coupled to a first common voltage;

a second current limiting resistor, comprising a first terminal and second terminal, wherein the first terminal of the second current limiting resistor is coupled to the first rectifier terminal of the bridge rectifier;

a detection capacitor, comprising a first terminal and a second terminal, wherein the first terminal of the detection capacitor is coupled to the second terminal of the second current limiting resistor, and the second terminal of the detection capacitor is coupled to the first common voltage;

a threshold voltage switch, comprising a first terminal and a second terminal, wherein the first terminal of the threshold voltage switch is coupled to the second terminal of the second current limiting resistor, wherein the threshold voltage switch is conducted when a voltage between the first terminal of the threshold voltage switch and the second terminal of the threshold voltage switch is greater than a threshold voltage; and a control circuit, for determining whether the present state is the normal state or the power failure state according to a current/voltage status of the threshold voltage switch.

4. The integrated lamp with automatic emergency light and regular light according to claim 3, wherein the control circuit comprises:

a photo coupler, comprising a first input terminal, a second input terminal, a first output terminal and a second output terminal, wherein the first input terminal of the photo coupler is coupled to the second terminal of the threshold voltage switch, the second input terminal of the photo coupler is coupled to the first common voltage, and the second output terminal of the photo coupler is coupled to a second common voltage;

a pull high resistor, comprising a first terminal and a second terminal, wherein the first terminal of the pull high resistor is coupled to a logic high voltage, and the second terminal of the pull high resistor is coupled to the first output terminal of the photo coupler; and a microcontroller, comprising a detection terminal, wherein the detection terminal of the microcontroller is coupled to the first output terminal of the photo coupler, wherein the microcontroller determines that the present state is the power failure state when a voltage of the detection terminal of the microcontroller is the logic high voltage for a preset period.

5. The integrated lamp with automatic emergency light and regular light according to claim 3, wherein the threshold voltage switch is a diode AC switch.

6. The integrated lamp with automatic emergency light and regular light according to claim 3, wherein the lamp circuit comprises:

a power factor corrector, coupled to the first rectifier terminal and the second rectifier terminal of the bridge rectifier, wherein the power factor corrector comprises a first output terminal and a second output terminal which respectively provides a first DC voltage and a second DC voltage, wherein the power factor corrector is used for performing power factor correction;

a battery charging circuit, comprising an input terminal and an output terminal, wherein the input terminal of the battery charging circuit is coupled to the first output terminal of the power factor corrector, the output terminal of the battery charging circuit is coupled to the battery, wherein the battery charging circuit converts the first DC voltage to a battery charging voltage for charging the battery;

a lamp driving circuit, comprising an input terminal and an output terminal, wherein the input terminal of the lamp driving circuit is coupled to the second output terminal of the power factor corrector, wherein the lamp driving circuit converts the second DC voltage to a lamp driving voltage; and an LED lamp, coupled to the output terminal of the lamp driving circuit for receiving the lamp driving voltage.

7. The integrated lamp with automatic emergency light and regular light according to claim 6, wherein the power factor corrector comprises:

a transformer, comprising a primary winding, a first secondary winding and a second secondary winding, wherein the primary winding comprises a first terminal and a second terminal, and the first secondary winding and the second secondary winding respectively comprise a first terminal and a second terminal, wherein the first terminal of the primary winding is coupled to the first rectifier terminal of the bridge rectifier, and the second terminals of the first and the second secondary windings are coupled to the second common voltage;

an electrical switch, comprising a first terminal, a second terminal and a control terminal, wherein the first terminal of the electrical switch is coupled to the second terminal of the primary winding of the transformer, and the second terminal of the electrical switch is coupled to the first common voltage;

a pulse width modulation (PWM) circuit, coupled to the control terminal of the electrical switch, for controlling the conduction of the electrical switch by PWM to further control voltages of the first and the second secondary windings;

a first rectifier diode, comprising an anode and a cathode, wherein the anode of the first rectifier diode is coupled to the first terminal of the first secondary winding, and the cathode of the first rectifier diode is coupled to the input terminal of the battery charging circuit;

a first rectifier capacitor, comprising a first terminal and a second terminal, wherein the first terminal of the first rectifier capacitor is coupled to the cathode of the first rectifier diode, and the second terminal of the first rectifier capacitor is coupled to the second common voltage;

a second rectifier diode, comprising an anode and a cathode, wherein the anode of the second rectifier diode is coupled to the first terminal of the second secondary winding, and the cathode of the second rectifier diode is coupled to the input terminal of the lamp driving circuit; and a second rectifier capacitor, comprising a first terminal and a second terminal, wherein the first terminal of the second rectifier capacitor is coupled to the cathode of the second rectifier diode, and the second terminal of the second rectifier capacitor is coupled to the second common voltage.

8. An integrated lamp with automatic emergency light and regular light, coupled to an alternate current (AC) power source, wherein the AC power source comprises a first AC terminal and a second AC terminal, wherein the integrated lamp with automatic emergency light and regular light is controlled by a lamp switch, wherein the lamp switch comprises a first terminal, a first socket, a second terminal and a second socket, wherein the first terminal of the lamp switch is coupled to the first AC terminal through the first socket, wherein the integrated lamp with automatic emergency light and regular light comprises:

a plug-in resistance element, includes a first plug, a second plug, a first socket and a second socket, wherein the first plug of the plug-in resistance element is coupled to the first terminal of the lamp switch through the first socket of the lamp switch, and the second plug of the plug-in resistance element is coupled to the second terminal of the lamp switch through the second socket of the lamp switch, and the first socket of the plug-in resistance element is coupled to the first AC terminal;

an AC detector, coupled between the second socket of the plug-in resistance element and the second AC terminal, wherein the AC detector detects a voltage/current status between the second terminal of the lamp switch and the second AC terminal through the plug-in resistance element to determine whether a present state is a power failure state or a normal state when the lamp switch is turned off;

a battery, disposed in the integrated lamp with automatic emergency light and regular light, for providing an electrical power to the integrated lamp with automatic emergency light and regular light in power failure; and a lamp circuit, comprising a first input terminal and a second input terminal, wherein the first input terminal of the lamp circuit is coupled to the second socket of the plug-in resistance element, and the second input terminal of the lamp circuit is coupled to the second AC terminal;

wherein the lamp circuit turns a lamp of the lamp circuit on by using a received AC power when the lamp switch is turned on, wherein the lamp circuit turns the lamp of the lamp circuit off when the lamp switch is turned off and the AC detector determines that the present state is the normal state, wherein the lamp circuit turns the lamp of the lamp circuit on by using the electrical power of the battery when the lamp switch is turned off and the AC detector determines that the present state is the power failure state, wherein the AC detector determines that the present state is the normal state when the AC detector detects that an AC current/voltage goes to the indication light circuit and the lamp switch is turned off, and wherein the AC detector determines that tile present state is the power failure state when the AC detector does not detect that the AC current/voltage goes to the indication light circuit.

9. The integrated lamp with automatic emergency light and regular light according to claim 8, wherein the plug-in resistance element comprises:

a first current limiting resistance, comprising a first terminal and a second terminal, wherein the first terminal of the first current limiting resistance is coupled to the first plug of the plug-in resistance element, and the second terminal of the first current limiting resistance is coupled to the second plug of the plug-in resistance element.

10. The integrated lamp with automatic emergency light and regular light according to claim 8, wherein the AC detector comprises:

a bridge rectifier, comprising a first input terminal, a second input terminal, a first rectifier terminal and a second rectifier terminal, wherein the first input terminal is coupled to the second terminal of the lamp switch, the second input terminal of the bridge rectifier is coupled to the second AC terminal, the second rectifier terminal is coupled to a first common voltage;

a second current limiting resistor, comprising a first terminal and second terminal, wherein the first terminal of the second current limiting resistor is coupled to the first rectifier terminal of the bridge rectifier;

a detection capacitor, comprising a first terminal and a second terminal, wherein the first terminal of the detection capacitor is coupled to the second terminal of the second current limiting resistor, and the second terminal of the detection capacitor is coupled to the first common voltage;

a threshold voltage switch, comprising a first terminal a second terminal, wherein the first terminal of the threshold voltage switch is coupled to the second terminal of the second current limiting resistor, wherein the threshold voltage switch is conducted when a voltage between the first terminal of the threshold voltage switch and the second terminal of the threshold voltage switch is greater than a threshold voltage; and a control circuit, for determining whether the present state is the normal state or the power failure state according to a current/voltage status of the threshold voltage switch.

11. The integrated lamp with automatic emergency light and regular light according to claim 10, wherein the control circuit comprises:

a photo coupler, comprising a first input terminal, a second input terminal, a first output terminal and a second output terminal, wherein the first input terminal of the photo coupler is coupled to the second terminal of the threshold voltage switch, the second input terminal of the photo coupler is coupled to the first common voltage, and the second output terminal of the photo coupler is coupled to a second common voltage;

a pull high resistor, comprising a first terminal and a second terminal, wherein the first terminal of the pull high resistor is coupled to a logic high voltage, and the second terminal of the pull high resistor is coupled to the first output terminal of the photo coupler; and a microcontroller, comprising a detection terminal, wherein the detection terminal of the microcontroller is coupled to the first output terminal of the photo coupler, wherein the microcontroller determines that the present state is the power failure state when a voltage of the detection terminal of the microcontroller is the logic high voltage for a preset period.

12. The integrated lamp with automatic emergency light and regular light according to claim 10, wherein the threshold voltage switch is a diode AC switch.

13. The integrated lamp with automatic emergency light and regular light according to claim 10, wherein the lamp circuit comprises:

a power factor corrector, coupled to the first rectifier terminal and the second rectifier terminal of the bridge rectifier, wherein the power factor corrector comprises a first output terminal and a second output terminal which respectively provides a first DC voltage and a second DC voltage, wherein the power factor corrector is used for performing power factor correction;

a battery charging circuit, comprising an input terminal and an output terminal, wherein the input terminal of the battery charging circuit is coupled to the first output terminal of the power factor corrector, the output terminal of the battery charging circuit is coupled to the battery, wherein the battery charging circuit converts the first DC voltage to a battery charging voltage for charging the battery;

a lamp driving circuit, comprising an input terminal and an output terminal, wherein the input terminal of the lamp driving circuit is coupled to the second output terminal of the power factor corrector, wherein the lamp driving circuit converts the second DC voltage to a lamp driving voltage; and an LED lamp, coupled to the output terminal of the lamp driving circuit for receiving the lamp driving voltage.

14. The integrated lamp with automatic emergency light and regular light according to claim 13, wherein the power factor corrector comprises:

a transformer, comprising a primary winding, a first secondary winding and a second secondary winding, wherein the primary winding comprises a first terminal and a second terminal, and the first secondary winding and the second secondary winding respectively comprise a first terminal and a second terminal, wherein the first terminal of the primary winding is coupled to the first rectifier terminal of the bridge rectifier, and the second terminals of the first and the second secondary windings are coupled to the second common voltage;

an electrical switch, comprising a first terminal, a second terminal and a control terminal, wherein the first terminal of the electrical switch is coupled to the second terminal of the primary winding of the transformer, and the second terminal of the electrical switch is coupled to the first common voltage;

a pulse width modulation (PWM) circuit, coupled to the control terminal of the electrical switch, for controlling the conduction of the electrical switch by PWM to further control voltages of the first and the second secondary windings;

a first rectifier diode, comprising an anode and a cathode, wherein the anode of the first rectifier diode is coupled to the first terminal of the first secondary winding, and the cathode of the first rectifier diode is coupled to the input terminal of the battery Charging circuit;

a first rectifier capacitor, comprising a first terminal and a second terminal, wherein the first terminal of the first rectifier capacitor is coupled to the cathode of the first rectifier diode, and the second terminal of the first rectifier capacitor is coupled to the second common voltage;

a second rectifier diode, comprising an anode and a cathode, wherein the anode of the second rectifier diode is coupled to the first terminal of the second secondary winding, and the cathode of the second rectifier diode is coupled to the input terminal of the lamp driving circuit; and a second rectifier capacitor, comprising a first terminal and a second terminal, wherein the first terminal of the second rectifier capacitor is coupled to the cathode of the second rectifier diode, and the second terminal of the second rectifier capacitor is coupled to the second common voltage.

* * * * *